United States Patent [19]

Chiang

[11] Patent Number: 5,387,750
[45] Date of Patent: Feb. 7, 1995

[54] TWO-COMPONENT URETHANE IN-MOLD COATING COMPOSITION

[75] Inventor: Nien-chu Chiang, Homewood, Ill.

[73] Assignee: The Sherwin-Williams Company, Cleveland, Ohio

[21] Appl. No.: 113,443

[22] Filed: Aug. 27, 1993

[51] Int. Cl.$^6$ .............................................. C08G 18/10
[52] U.S. Cl. ........................................ 528/52; 528/58; 528/60
[58] Field of Search ........................... 528/52, 58, 60

[56] References Cited

U.S. PATENT DOCUMENTS

| | | | |
|---|---|---|---|
| 4,076,788 | 2/1978 | Ditto | 264/255 |
| 4,081,578 | 3/1978 | van Essen et al. | 428/63 |
| 4,189,517 | 2/1980 | Shanoski et al. | 428/423.7 |
| 4,242,415 | 12/1980 | Feltzin et al. | 428/412 |
| 4,245,006 | 1/1981 | Shanoski | 428/423.7 |
| 4,414,173 | 11/1983 | Cobbledick et al. | 264/257 |
| 4,477,405 | 10/1984 | Makhlouf et al. | 264/250 |
| 4,668,460 | 5/1987 | Ongena | 264/255 |
| 5,132,052 | 7/1992 | Cobbledick et al. | 252/511 |

*Primary Examiner*—Maurice J. Welsh
*Attorney, Agent, or Firm*—Heidi A. Boehlefeld; Robert E. McDonald; Steven W. Tan

[57] ABSTRACT

A method for producing an in-mold coated plastic article having an adherent coating wherein the coating composition has improved surface coverage properties and a fast cure rate. The coating composition contains (a) a first component comprising at least one polyol having at least 4 hydroxyl groups and a viscosity at room temperature of 6000 cps or less; and (b) a second component comprising a solvent-free isocyanate prepolymer. The viscosity of the coating composition is 15000 cps or less at room temperature.

10 Claims, No Drawings

TWO-COMPONENT URETHANE IN-MOLD COATING COMPOSITION

FIELD OF THE INVENTION

This invention relates to a two-component urethane coating for plastic substrates, and more particularly, to a two-component, solvent free urethane in-mold coating composition having reduced viscosity and improved surface coverage properties.

BACKGROUND OF THE INVENTION

In-mold coating processes have been developed to improve the quality of the surface of a molded article after the curing of the article in a compression mold has been substantially completed. In the compression molding process, two or more shaped mold elements cooperate to define a mold cavity. A molding composition typically comprising a polymerizable thermosetting or thermoplastic resin and fibrous reinforcing material and usually fillers, catalysts, mold release agents, and other reagents is introduced into the mold cavity between the mold surfaces. The shaped mold elements are brought together to spread the molding composition throughout the mold cavity and to confine the molding composition until curing is essentially completed. The molded article is then coated within the mold.

A process for molding and coating a substrate in a mold is described in U.S. Pat. No. 4,668,460, which is incorporated herein by reference. This process typically involves injecting a resin compound into a shaped mold, compressing the mold to form the desired substrate, applying heat to cure the resin, and injecting a coating composition into the mold to coat the substrate. U.S. Pat. No. 4,668,460 describes a method of coating the substrate in which the coating composition is injected into the closed, pressurized mold cavity at a high pressure and is forced over the surface of and compresses the substrate.

The ability of the coating to adequately cover the substrate depends in part on the viscosity of the coating composition. For example, application of a coating composition to the surface of a flexible thermoplastic substrate can be improved when the viscosity of the coating is relatively low, i.e., 15000 cps or less at room temperature.

Therefore, it is an object of the present invention to provide a two-component urethane coating having reduced viscosity and improved surface coverage properties.

Another object of this invention is to provide a cured molded thermoplastic part with an adherent in-mold coating.

These and other objects and advantages of the present invention will become more apparent to those skilled in the art from the following detailed description of the invention.

SUMMARY OF THE INVENTION

According to the present invention, an in-mold coating composition is provided for plastic molded articles. The composition includes: (a) a first component comprising at least one polyol having at least 4 hydroxyl groups and a viscosity at room temperature of 6000 cps or less; (b) a second component comprising a solvent-free isocyanate prepolymer; wherein the viscosity of the coating composition is 15000 cps or less at room temperature.

The composition is employed as a two-component in-mold coating for plastic articles known in the art.

The present invention further relates to a method of in-mold coating a substrate including the steps of (1) mixing an in-mold coating composition comprising (a) a first component comprising at least one polyol having at least 4 hydroxyl groups and a viscosity at room temperature of 6000 cps or less; (b) a second component comprising a solvent-free isocyanate prepolymer; wherein the viscosity of the coating composition is 15000 cps or less at room temperature; (2) molding the substrate between at least two separable mold dies which form a mold cavity therebetween compatible with forming the substrate until the substrate reaches a condition where its surface has cured to the point that it is receptive to a coating; (3) injecting the coating composition into the mold cavity at a pressure substantially in excess of what the positive mold cavity pressure was immediately prior to injection while maintaining the dies in a pressurized, closed position whereby the coating composition is forced over the surface of and compresses the substrate; and (4) curing the coated, formed substrate.

DETAILED DESCRIPTION OF THE INVENTION

Coating Composition

The two-component urethane coating of the present invention has a viscosity at room temperature of 15000 or less and comprises a polyol first component and an isocyanate prepolymer second component. The polyol first component comprises at least one polyol having at least 4 hydroxyl groups, a viscosity at room temperature of 6000 cps or less, and is solvent free. For coatings to be used in interior applications, an amine-based tetrafunctional polyol, such as POLYOL 355 from BASF, is a preferred ingredient due to its built-in catalyst activity and relatively low viscosity of 2700 cps at room temperature. Examples of other preferred polyols include VORANOL 270-370, a propylene oxide based polyether polyol commercially available from Dow Chemical, and having a hydroxyl functionality of 7 and a viscosity at room temperature of 2300 cps. HDM 361 from Union Carbide, a sucrose based tetra-hydroxyl polyether polyol having a viscosity of 3000 cps at room temperature is also a preferred polyol.

Lower functionality, i.e., 2 or 3 hydroxyl groups, polyols with molecular weights of 2000 or less may be added to the polyol component as minor ingredients to help lower the viscosity of the coating to 15000 cps or lower.

The second component of the present invention comprises a solvent-free isocyanate prepolymer. Water white aromatic and aliphatic isocyanates are preferred. Examples of such isocyanates include biuret of hexamethylene diisocyanates such as DESMODUR N-3200 commercially available from Miles and TOLONATE HDB and HDB-LV commercially available from Rhone-Poulenc; isocyanurate of hexamethylene diisocyanates such as DESMODUR N-3300 commercially available from Miles, TOLONATE HDT and HDT-LV commercially available from Rhone-Poulenc; and diphenylmethane diisocyanate (MDI) based aromatic isocyanate prepolymers such as RUBINATE LF 209, LF 179 and PBA 2210 commercially available from Zeneca Resins. Dark colored MDI based aromatic isocyanate prepolymers that may be used in dark colored coatings or coatings which are used as primers include MODUR MR200, MR, MRS, and CD commercially available from Miles. Aliphatic isocyanate prepolymers are preferred for use in coatings which must possess weather resistance.

The ratio of equivalents of isocyanate to active hydrogen from the hydroxyl groups of the polyol can be widely varied within the practice of this invention. An excess of equivalents of isocyanate is typically used so that the product does not have any free —NH$_2$, —NH—, and/or —OH groups. Preferably, the isocyanate is present at a level to provide between about 5 to 15% excess equivalents of isocyanate for each equivalent of active hydrogen from the hydroxyl groups of the polyol. More preferably, an excess of between about 8–10% of isocyanate is present.

In addition to the polymerizable components, the in-mold coating may also contain pigments, conductive materials such as carbon black, mold release agents, catalysts, accelerators, flow agents, thickeners, UV absorbers and other additives.

A polyurethane catalyst preferably should be used to facilitate reaction at a reasonable rate between the isocyanate and the polyol. The polyurethane catalyst may be a tin compound such as an organotin compound or a tin salt of a carboxylic acid. Examples of such tin catalysts are tetravalent tin organic compounds like dibutyl tin dilaurate (preferred), dibutyl tin diacetate, dibutyl tin di-2-ethyl hexoate, di-2-ethyl hexyl tin bis (2-ethyl hexoate), dibutyl tin distearate, tetramethyl tin and tetra-n-butyl tin and the like and mixtures thereof.

The mold release agent is a common additive under standard molding practice. It functions as an external lubricant so that after molding is completed and the mold is opened, the coated article can be removed readily with minimum handling and, therefore, a reduced incidence of scratching or abrasion. There are many types of mold release agents conventionally used in molding compounds. Examples of suitable materials include zinc stearate, magnesium stearate, lecithin and DuPont's ZELEC NE aliphatic phosphate. The preferred mold release agent is MOLD WIZ Interim 113, which is based on fatty acid/organic acid and glycerides and is commercially available from Axel Plastic Research Labs.

A water binding agent or moisture scavenger or molecular sieve will generally be added to protect against carbon dioxide formation and other undesired side reactions.

A flow agent may be added to the coating composition to reduce the viscosity of the coating composition. SOLSPERSE 24000 surfactant, which contains an amide of 12-hydroxystearic acid polyester with polyethyleneimine and is manufactured by Zeneca Resins, has been found to be useful for this purpose.

UV absorbers and hindered amine light stabilizers may be added to the polyol component to enhance the weatherability of the coating. Examples of useful UV absorbers include substituted hydroxyphenyl benzotriazoles such as TINUVIN 328 and TINUVIN 1130 from Ciba-Geigy, substituted benzotriazoles such as CYASORB UV-5411 from American Cyanamid, and substituted benzophenone such as CYASORB UV-531 also from American Cyanamid. Examples of useful hindered amine light absorbers include TINUVIN 292, TINUVIN 440 and TINUVIN 123 from Ciba-Geigy and CYASORB UV-3581, UV-3604, UV-3815 UV-3667 and UV-2908 from American Cyanamid. Typically, about 0.5% to about 5% of a UV absorber based on the weight of the first component will provide protection against UV degradation.

Coating Process

The coating composition of the present invention is particularly useful in coating compression molded thermoplastic resin substrates, and primarily thermoplastic resin substrates which have come to be known in the art as reaction injection molding (RIM), reinforced reaction injection molding (RRIM), resin transfer molding (RTM), structural reaction injection molding (SRIM) and stampable thermoplastic composite substrates.

To form the coating composition of the present invention, predetermined volumes of each component are mixed in an impingement mixer prior to injection into the mold. To ensure the proper mixing, the polyol component is preferably heated so that its viscosity is reduced to approximately that of the isocyanate prepolymer component. The coating composition can be injected into the mold after the substrate has completely cured, or, preferably, when the substrate has sufficiently cured so that the coating will not adversely penetrate the under-cured substrate. The coating composition is injected into the mold between the surface of the substrate and the mold surface under a high sheer pressure of at least 4000 psi. Thereafter, the mold is retained in a closed position for a sufficient period to allow the molded substrate to complete further curing and to allow the coating composition to be cured as an adherent coating over at least one surface of the molded substrate.

The cure time required for the coating should be slow enough to allow the coating to flow over the substrate in the mold prior to excessive gelation, but short enough to allow substantial curing within the molding cycle. The cure time of the coating depends on a number of factors, including the thickness of the coating, the temperature of the mold, the amount of catalyst and the reactivity of the polyol and the isocyanate prepolymer. The cure time of the coating is typically about 40–60 seconds at a mold temperature of about 140°–250° F.

The viscosity of the coating composition of the present invention is 15000 cps, or less, at room temperature. Preferably, the viscosity of the coating composition is within the range of about 5000 to about 10000 cps at room temperature.

EXAMPLE 1

An in-mold coating composition was prepared in accordance with the present invention and coated onto a thermoplastic molded article using the in-mold coating process described in U.S. Pat. No. 4,668,460. The coating composition contained the following ingredients as shown in Table I.

TABLE I

|  | pounds | weight % |
|---|---|---|
| Component 1 | | |
| Polyol 355 | 218 | 17.53% |
| HDM 361 | 273 | 21.96% |
| Voranol 270-370 | 265 | 21.31% |
| TiO$_2$ Pigment | 467 | 37.56% |
| Mold Wiz Interim 113 | 5.3 | 0.43% |
| Solsperse 24000 surfactant | 9.3 | 0.75% |
| Dibutyltin Dilaurate | 5.7 | 0.46% |
| Component 2 | | |

TABLE I-continued

| | pounds | weight % |
|---|---|---|
| Desmodur N-3200 | 1026 | |

The resulting coating was 4–5 mils thick and had a pencil hardness (ASTM D3363) of 2H and showed excellent chemical resistance and humidity resistance (ASTM D4585). The coating exhibited less than 100 mg loss for Taber Abrasion Resistance (ASTM D4060) and no gloss loss after 350 hours of QUV weather testing (ASTM 4587).

While the invention has been shown and described with respect to a particular embodiment thereof, this is for the purpose of illustration rather than limitation, and other variations and modifications of the specific embodiment herein shown and described will be apparent to those skilled in the art and are within the intended spirit and scope of the invention.

We claim:

1. A coating composition for use as an in-mold coating composition comprising:
   (a) a first component comprising at least one polyol having at least 4 hydroxyl groups and a viscosity of 6000 cps or less at room temperature; and
   (b) a second component comprising a solvent-free isocyanate prepolymer;
   wherein the viscosity of the coating composition is 15000 cps or less at room temperature.

2. The composition of claim 1 wherein said polyol is selected from the group consisting of an amine-based tetra-functional polyol, a propylene oxide based polyether polyol, and a sucrose based tetra-hydroxyl polyether polyol.

3. The composition of claim 1 wherein said second component is selected from the group consisting of a biuret of hexamethylene diisocyanate, isocyanurate of hexamethylene diisocyanate, and diphenylmethane diisocyanate based aromatic prepolymers.

4. The composition of claim 1 wherein the viscosity of the coating composition is between about 5000 and about 10000 cps at room temperature.

5. The composition of claim 1 further comprising a mold release agent.

6. The composition of claim 1 further comprising a polyurethane catalyst.

7. The composition of claim 6 wherein the polyurethane catalyst comprises dibutyl tin dilaurate.

8. The composition of claim 1 further comprising at least one pigment.

9. The composition of claim 1 further comprising a surfactant comprising an amide of 12-hydroxystearic acid polyester with polyethyleneimine.

10. The composition of claim 1 further comprising at least one weatherability enhancer selected from the group consisting of a UV absorber and a hindered amine light stabilizer.

* * * * *